United States Patent [19]
Ellis

[11] Patent Number: 5,907,948
[45] Date of Patent: Jun. 1, 1999

[54] APPARATUS FOR SUPPORTING DISC CUTTERBAR MODULES

[76] Inventor: Preston L. Ellis, 216 Providence Pl., Mountville, Pa. 17554

[21] Appl. No.: 09/059,621

[22] Filed: Apr. 15, 1998

Related U.S. Application Data

[62] Division of application No. 08/673,604, Jun. 25, 1996, Pat. No. 5,784,866
[60] Provisional application No. 60/000,816, Jun. 26, 1995, and provisional application No. 60/001,340, Jul. 24, 1995.

[51] Int. Cl.$^6$ .................................................. A01D 34/03
[52] U.S. Cl. .................................................. 56/13.6; 56/6
[58] Field of Search .............................. 56/6, 13.6, 14.6, 56/15.2, DIG. 15, 13.7, 255, 295, DIG. 6, DIG. 14, DIG. 20; 480/16, 20, 21

[56] References Cited

U.S. PATENT DOCUMENTS

| | | | |
|---|---|---|---|
| 4,573,308 | 3/1986 | Ehrecke et al. | 56/14.4 |
| 4,986,060 | 1/1991 | Walters et al. | 56/6 |
| 5,012,635 | 5/1991 | Walters et al. | 56/13.6 |
| 5,809,757 | 9/1998 | McLean et al. | 56/13.6 |

*Primary Examiner*—Thomas B. Will
*Assistant Examiner*—Robert Pezzuto
*Attorney, Agent, or Firm*—Larry W. Miller; J. William Stader; Frank A. Seemar

[57] ABSTRACT

A modular disc cutterbar utilizes self-contained cutter modules clamped between alternating spacer modules by fasteners engaged with the spacer modules. To resist bending moments in the cutterbar, selected fasteners can have a length to span more than one cutter module. The drive mechanism is also of a modular construction including a symmetrical, reversible sealed drive apparatus within each cutter module and a transfer shaft passing through each interstitial spacer module to interconnect each cutter module drive mechanism. The drive apparatus incorporates an oil slinger to keep the remote seals lubricated. The rock guard for each cutter module is mounted on the adjacent spacer modules, while the skid shoe mounting is simplified. A crop mover mounted on each disc member above the cutting knife improves the transfer of severed crop material. An oil slinger mounted on the drive assembly within the cutter module draws oil from the reservoir past the adjacent bearing and disperses the oil onto the corresponding seal member for lubrication and cooling thereof.

6 Claims, 12 Drawing Sheets

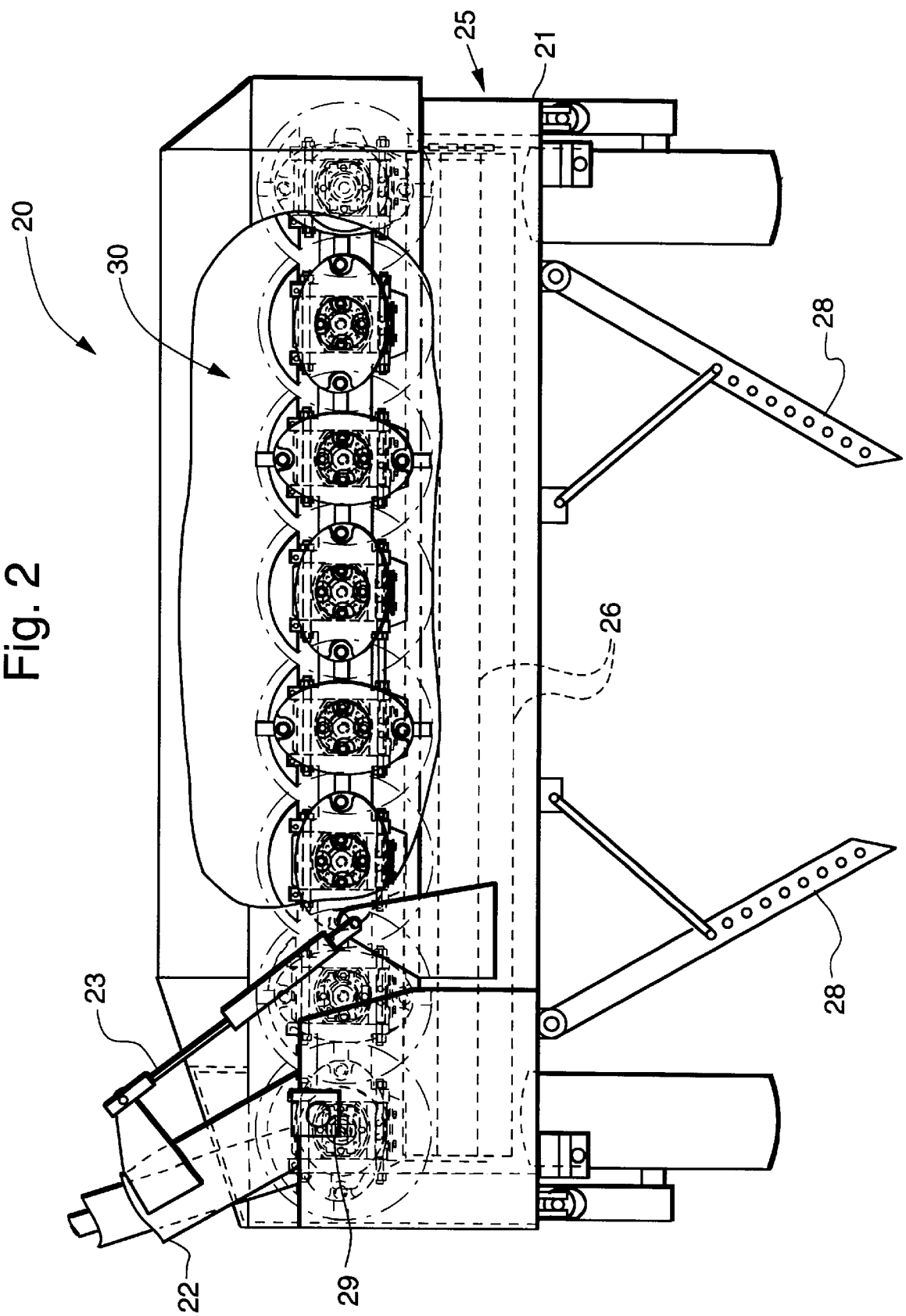

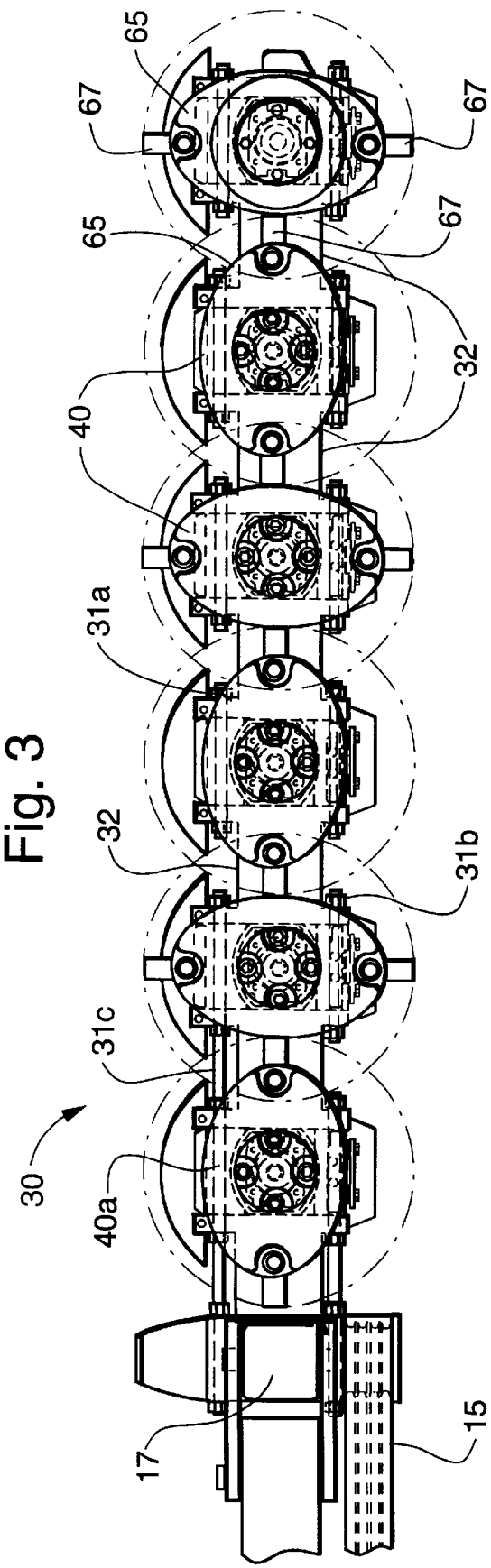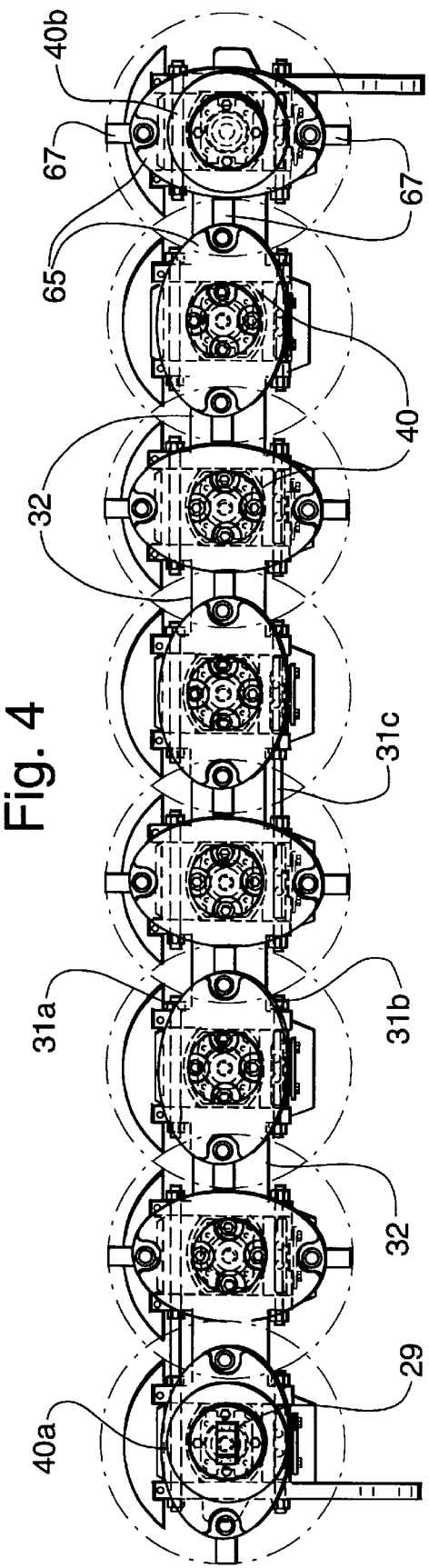

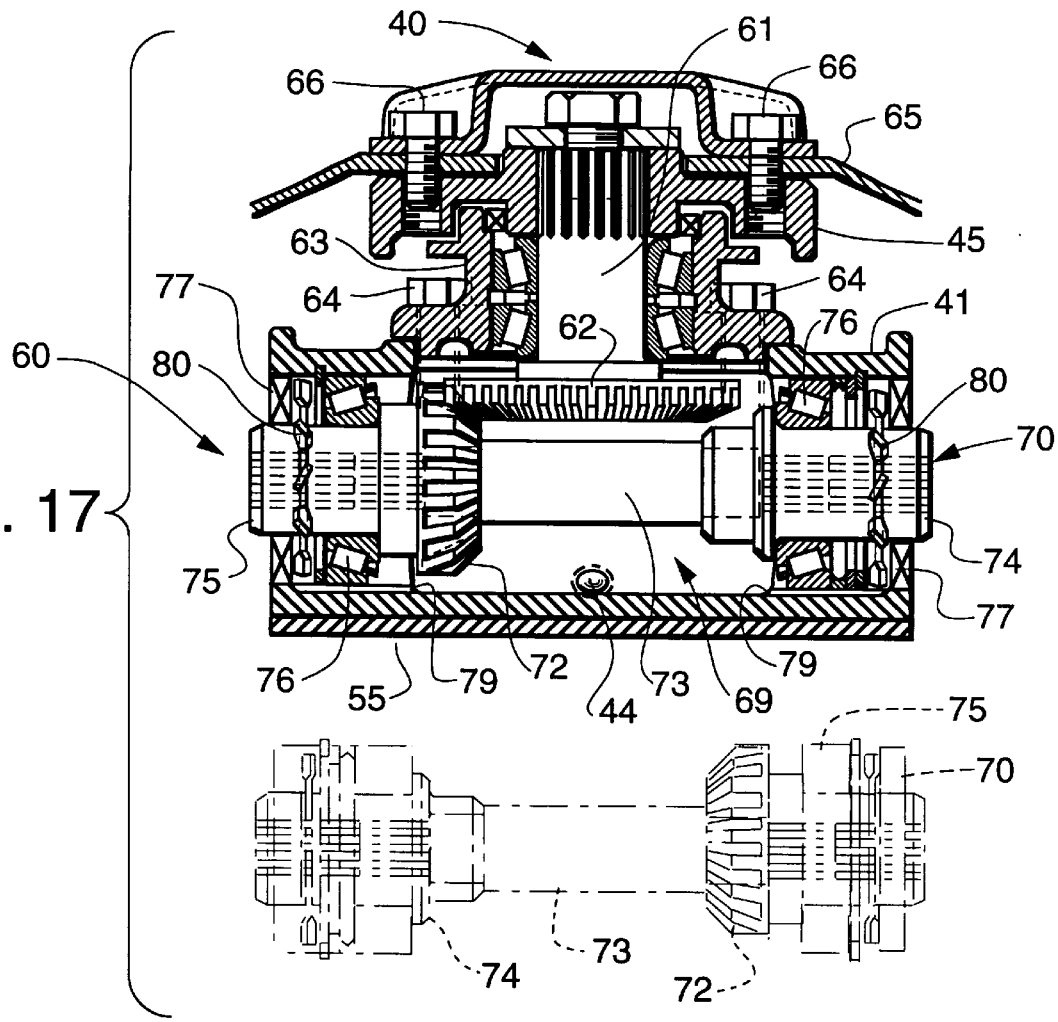
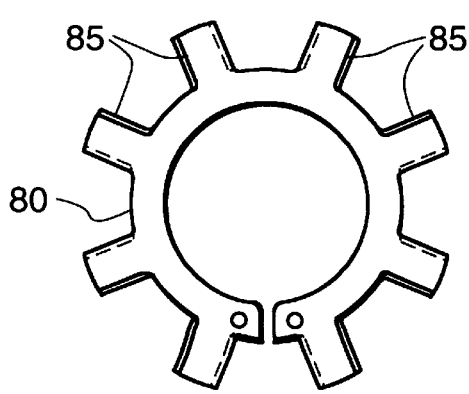
Fig. 18
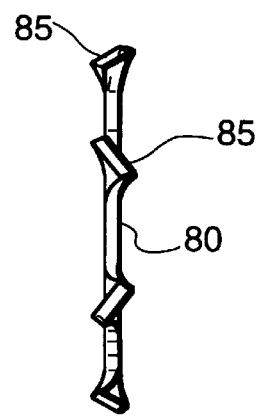
Fig. 19

APPARATUS FOR SUPPORTING DISC CUTTERBAR MODULES

CROSS-REFERENCE TO RELATED APPLICATIONS

This application is a division of U.S. patent application Ser. No. 08/673,604, filed Jun. 25, 1996, now U.S. Pat. No. 5,784,866, claiming benefit from U.S. Provisional patent application Ser. No. 60/000,816, filed Jun. 26, 1995, and U.S. Provisional patent application Ser. No. 60/001,340, filed Jul. 24, 1995.

BACKGROUND OF THE INVENTION

This invention relates generally to a machine for severing standing crops from the ground to initiate a harvesting process and, more particularly, to a rotary disc cutterbar having a preselected number of transversely oriented, rotatable discs having knives mounted thereon to sever standing crop by an impact action upon rotation of the discs.

Disc cutterbars have been utilized in agricultural harvesting implements for many years. Each disc cutterbar includes a plurality of transversely spaced disc cutters driven for rotation about a generally vertical axis. Each disc cutter has two or three knives pivotally mounted on the periphery thereof to sever standing crop from the ground through an impact action. For background information on the structure and operation of disc cutterbars, reference is made to U.S. Pat. No. 4,815,262, issued to E. E. Koch and F. F. Voler, the descriptive portions thereof being incorporated herein by reference.

The construction of disc cutterbars has evolved over the years to the configuration of having a modular construction with cutter modules and spacer modules, such as shown in U.S. Pat. No. 4,840,019, issued to L. J. Pingry, the descriptive portions of which are incorporated herein by reference. In some instances, the cutter modules and the spacer modules were integrally formed into one unit such as shown and described in U.S. Pat. No. 4,947,629, issued to R. Ermacora and H. Neuerburg.

It has been found that the specific use of the disc cutterbar apparatus, e.g. whether used as part of a disc mower, such as shown and depicted in U.S. Pat. No. 4,955,187, issued to C. van der Lely, which is typically supported at one end, or as part of a disc mower-conditioner which usually provides support to the cutterbar at both opposing ends thereof, carries with that particular use a different set of design parameters than other machines in which the cutterbar is utilized.

For example, the load imparted stresses relative to the spacer segments or modules on a disc mower cutterbar are different than the corresponding stresses on a disc mower-conditioner cutterbar. The tensile loads on the cutterbar are highest at the rear and center when used in a disc mower-conditioner, but at the front and inboard tractor end of the cutterbar when utilized in a disc mower.

A modular disc cutterbar of the type shown in the aforementioned Pingry patent is made up of segments comprising drive modules and spacer modules which can be joined at flange faces with retention mechanisms like threaded fasteners. The cutterbar spacer modules which are used to space and support the drive modules need to be sized to carry the highest loads. Because of the need to keep spacer modules with a uniform size and configuration no matter where the location the spacer is used along the transverse length of the cutterbar, the same spacer configuration is used along the full length of the cutterbar, resulting in some spacer modules being lightly loaded and constructed stronger and heavier than is structurally needed.

The weight of the completed disc mower assembly on a disc mower-conditioner needs to be as light as possible to minimize the required size of the cutterbar flotation springs and to reduce the inertia forces imposed on the cutterbar components when the cutterbar strikes and slides over an obstacle at high ground speeds. The weight of the cutterbar when utilized in a disc mower configuration also needs to be as light as possible to minimize the force and friction from the ground to minimize the wear of the ground contacting skid shoes, and also to minimize the damage to the crop which comes in contact with the skid shoes. A further consideration in keeping the weight of the cutterbar as light as possible is to reduce the loads imposed on the frame components when the disc mower is placed into a transport position in which the total weight of the cutterbar is supported by the frame. A corollary consideration is the desire to keep these frame components as light as possible.

When the disc cutterbar is used in a disc mower configuration, the cutterbar is provided with detachable skid shoes to ride across the ground and protect the structure of the cutterbar. In designing cutter and spacer modules to minimize weight of the cutterbar, means for mounting the skid shoes to the cutter modules must be provided. The mounting of the skid shoes must permit a convenient mounting and removal of the skid shoe from the cutter module, while allowing the cutter module to have adequate surface area for heat dissipation, to have easy access to the oil level check plug and to the oil drain plug, and to be designed with an ample reservoir for oil therein.

The design of a cutter module that is clamped between opposing spacer modules requires a means by which a rock guard can be mounted on the cutterbar forwardly of each cutter module to protect the cutter module from damage. The rock guard is cooperatively associated with the skid shoe to protect the cutter module from damage. Known rock guard designs are supported on a flange in front of the disc cutter and threaded fasteners are used to clamp the rock guard to the disc cutter unit. As a result, the supporting flange has to be strong enough to support the rock guard when contacting an obstacle, requiring that the flange either be made large enough or of higher strength material to perform this function.

The rapid rotation of the disc members on which the cutting knives are mounted effects a cutting action to crop material through shear impact of the cutting knife into the standing crop. The knives are pivotally mounted on the disc member and can retract from the normal outwardly extended position during rotation of the disc member when striking an obstacle, such as a fence post or the like. Some known disc member structures carry knife stops to prevent the cutting knife from being able to rotate 360 degrees about its pivotal connection and wedging against the cutterbar housing. The provision of these knife stops increases the mass of the disc member being rotatably driven and is undesirable, yet necessary to restrict the movement of the cutting knives. Placement of the knife stops on the disc member can cause the disc member to be rotationally unbalanced, particularly if the stop is constructed such that cut crop can build up on the stop.

The drive mechanism for powering the rotation of the individual disc cutters typically includes a plurality of intermeshed spur gears rotatably mounted within a casing to rotate adjacent disc members in opposite directions. Some drive mechanisms utilize a drive shaft that extends transversely through the cutterbar casing. Corresponding bevel gears transfer rotational power from the drive shaft to the individual disc members.

In the known disc cutterbar mechanisms, the utilization of lubricating oil within the cutterbar casing lubricates the drive components; however, whenever the cutterbar is operating under sloped conditions, the lubricating oil would flow to the low point of the casing. Furthermore, the failure of any one of the gears comprising part of the drive components within the casing typically resulted in a catastrophic failure of the entire drive mechanism, as gear teeth sheared off of one gear would cause the failure of another gear set, and so on until substantially all of the gears sets were damaged.

The bearings supporting the transverse drive shaft require adequate lubrication to maintain adequate life, as do the radial lip seals at each end of the drive shaft components housed within the cutter modules. With the given design of the improved modular disc cutterbar, proper re-circulation of the lubricating fluid within the sealed cutter module is needed to obtain proper lubrication of the bearings and seals.

Disc cutterbars are known for leaving streaks, or strips of uncut crop material, at the location between the disc members that are diverging due to the alternating direction of rotation of consecutive disc members. It is believed that one cause for this crop streaking is the movement of cut crop off the disc cutterbar forwardly into the standing crop. Previous attempts to move cut crop rearwardly have been expressed in the form of crop lifters mounted on the surface of the disc member, such as shown in U.S. Pat. No. 4,549,390, issued to K. W. McLean, and in U.S. Pat. No. 4,567,716, issued to S. J. Makofka, P. J. Ehrhart and K. W. McLean. While such crop lifters have been shown to significantly improve the flow of cut crop rearwardly, the lifter structure increase the weight of the disc member.

SUMMARY OF THE INVENTION

It is an object of this invention to overcome the aforementioned disadvantages of the prior art by providing improvements to known disc cutterbar construction.

It is another object of this invention to provide a modular disc cutterbar construction that utilizes self-contained cutter modules clamped between separable spacer modules.

It is still another object of this invention to provide a drive mechanism for powering the rotation of transversely oriented disc members wherein the self-contained cutter unit is provided with a sealed drive apparatus.

It is a feature of this invention that rotational power is transmitted from one cutter module to the other by a transfer shaft interconnecting the drive apparatus in the adjacent cutter modules and passing through the interstitial spacer module.

It is an advantage of this invention that the self-contained cutter module does not share lubrication oil with any other cutter module.

It is another advantage of this invention that the failure of any cutter module component will not contaminate any other cutter module.

It is another feature of this invention that the cutter modules are clamped between adjacent spacer modules by fasteners spanning between the adjacent spacer modules.

It is another feature of this invention that the spacer modules are provided with dowel pins that are received within opening in the adjacent cutter module for properly orienting the spacial relationship between the adjacent cutter and spacer modules.

It is still another advantage of this invention that the modular construction of the disc cutterbar enables the individual replacement of any damaged module without requiring the replacement of other parts of the disc cutterbar.

It is still another feature of this invention that the cutter and spacer modules are constructed to minimize weight.

It is yet another object of this invention to construct the drive apparatus in a symmetrical manner so that the drive gear can be disposed on either side of the driven gear for selectively rotating the disc member in opposite directions.

It is yet another feature of this invention that the cutter module can be selectively configured in either a left or right hand version merely by orienting the drive shaft with the drive gear on the corresponding side of the driven gear.

It is yet another advantage of this invention that the drive apparatus is simplified by using a minimum amount of gearing.

It is still another feature of this invention that the drive shaft and pinion assembly is formed in a modular configuration with a central shaft member engaged with a hub at either end that also receives the transfer shaft.

It is a further object of this invention to provide a mechanism within the rotatable drive apparatus in each cutter module to keep the remote seals adequately lubricated during operation of the disc cutterbar.

It is a further feature of this invention that an oil slinger is provided between the bearings rotatably supporting the drive shaft and the remote seals to splash lubricating oil onto the remote seals.

It is still a further feature of this invention that the cutter module is configured with a relief groove to permit lubricating oil to flow past the bearings to reach the oil slinger.

It is yet a further feature of this invention that the oil slinger is provided with alternating angled blades to allow the slinger member to be mounted on the drive shaft apparatus in either direction.

It is still a further object of this invention to provide an effective and simplified manner for mounting the rock guard and skid shoes on the disc cutterbar.

It is yet a further feature of this invention that the rock guard is mounted to the clamping arms of the spacer modules positioned on opposite sides of a cutter module by a single fastener in each clamping arm.

It is a further advantage of this invention that the rock guard positioned in front of a cutter module for protection thereof is mounted to the spacer modules adjacent the cutter module.

It is yet a further advantage of this invention that any damage to the rock guard and the mounting mechanism thereof will affect only the spacer modules and not the more complex and expensive cutter module.

It is yet another feature of this invention that the skid shoe underlying each cutter module is mounted by a pair of fasteners engaged with the cutter module.

It is yet a further advantage of this invention that the mounting of the skid shoe to the cutter module requires standard hardware without requiring additional parts to support the skid shoe.

It is still a further object of this invention to provide a modular cutterbar construction that provides reinforcement at high stress points in whatever configuration the cutterbar is utilized.

It is still a further feature of this invention that the cutterbar can be provided with optional long fasteners spanning multiple cutter modules to provide structure to resist bending loads induced into the cutterbar by the operation of the implement in which the cutterbar is utilized.

It is still a further advantage of this invention that the optional long fasteners can be located at any position along the length of the cutterbar so as to be located at the most advantageous position.

It is yet a further object of this invention to provide a cutter module with an integral knife stop.

It is still another feature of this invention that the cutter module knife stop prevents the cutting knife from pivoting completely around its pivotal mounting on the disc member without permitting the cutting knife to wedge against the cutter module.

It is still another advantage of this invention that the placement of the knife stop into the structure of the cutter module eliminates the need to have an undesirable stop formed on the disc member.

It is yet another object of this invention to provide a crop mover on the disc member to transfer crop material just severed by the action of the cutting knife away from the knife.

It is yet another feature of this invention that the crop mover is mounted on the disc member above the cutting knife in a position that will not interfere with the cutting action at the outward tip of the cutting knife.

It is yet another advantage of this invention that the crop mover prevents severed crop from falling forwardly into the standing crop material and, thereby, restrict the ability of the knife to sever the crop on the next rotation of the disc member.

It is still another object of this invention to provide an improved modular disc cutterbar which is durable in construction, inexpensive of manufacture, carefree of maintenance, facile in assemblage, and simple and effective in use.

These and other objects, features and advantages are accomplished according to the instant invention by providing a modular disc cutterbar utilizing self-contained cutter modules clamped between alternating spacer modules by fasteners engaged with the spacer modules. To resist bending moments in the cutterbar, selected fasteners can have a length to span more than one cutter module. The drive mechanism is also of a modular construction including a symmetrical, reversible sealed drive apparatus within each cutter module and a transfer shaft passing through each interstitial spacer module to interconnect each cutter module drive mechanism. The drive apparatus incorporates an oil slinger to keep the remote seals lubricated. The rock guard for each cutter module is mounted on the adjacent spacer modules, while the skid shoe mounting is simplified. A crop mover mounted on each disc member above the cutting knife improves the transfer of severed crop material. An oil slinger mounted on the drive assembly within the cutter module draws oil from the reservoir past the adjacent bearing and disperses the oil onto the corresponding seal member for lubrication and cooling thereof.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a top plan view of a disc mower-conditioner utilizing a modular disc cutterbar incorporating the principles of the instant invention, the conventional draft tongue and PTO shaft being broken off, a portion of the top panel of the disc mower-conditioner being broken away to better view the disc cutterbar, the disc mower-conditioner being another of the configurations in which the modular disc cutterbar can be utilized;

FIG. 3 is an enlarged top plan view of the modular disc cutterbar as utilized in the disc mower shown in FIG. 1;

FIG. 4 is an enlarged top plan view of the modular disc cutter bar as utilized in the disc mower-conditioner shown in FIG. 2;

FIG. 17 is a cross-sectional view of the cutter module taken along lines 17—17 of FIG. 16 to depict the relationship of the drive mechanism therein, a reverse drive shaft assembly being shown in phantom below the cutter module to demonstrate the difference between the clockwise and counterclockwise drive mechanism for the cutter modules, oil slingers being shown at the appropriate locations at the ends of the drive shaft;

FIG. 18 is an axial elevational view of the oil slinger mounted on the cutter module drive mechanism in FIG. 17;

FIG. 19 is a transaxial elevational view of the oil slinger shown in FIG. 18;

DETAILED DESCRIPTION OF THE PREFERRED EMBODIMENT

Figure 1:
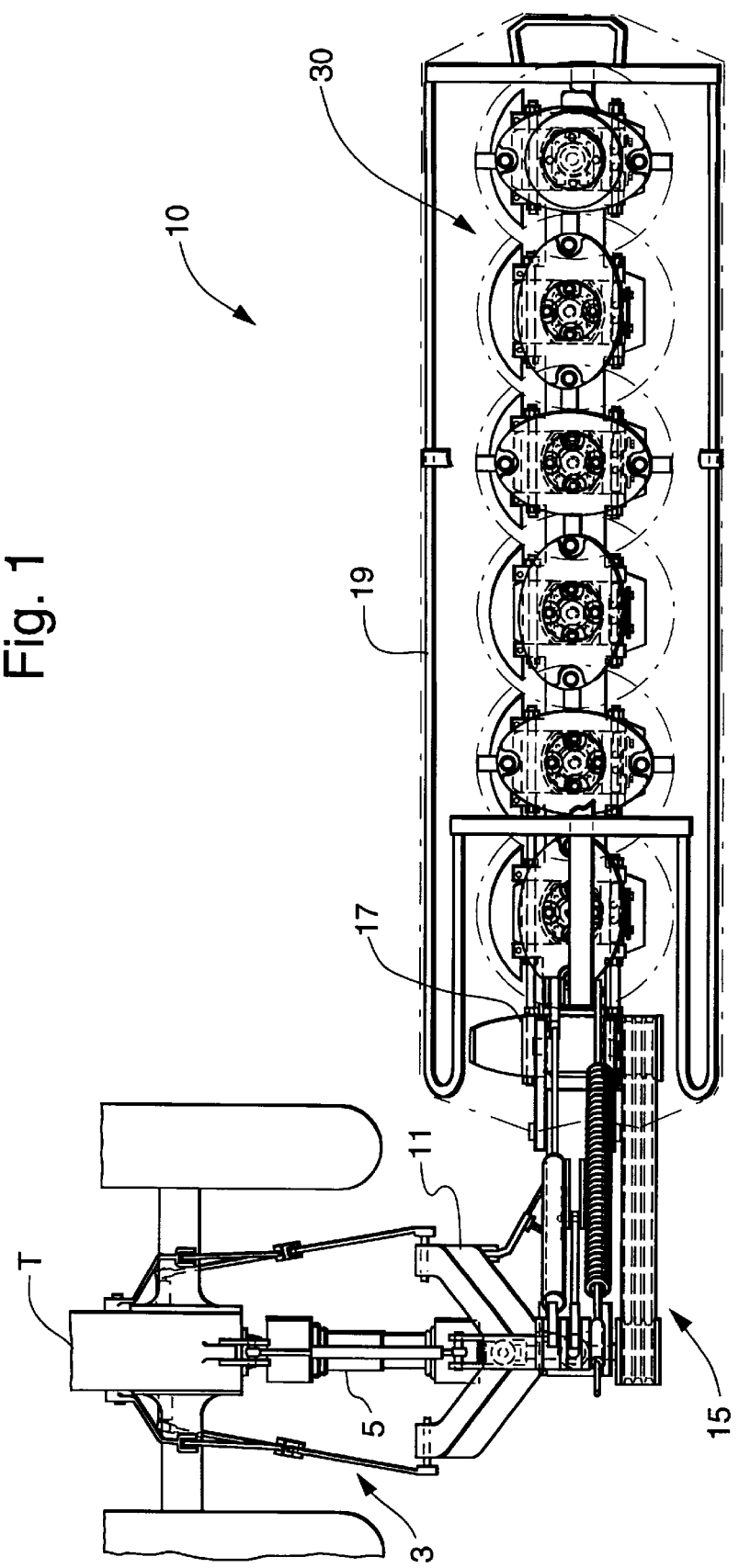
FIG. 1 is a top plan view of a disc mower mounted on the three-point hitch of a tractor, the disc mower having a modular disc cutterbar incorporating the principles of the instant invention, the customary protective cover for the disc mower being shown in phantom as is the rotational path of the individual disc members, the disc mower being one of the configurations in which the modular disc cutterbar can be utilized.
Figure 5:
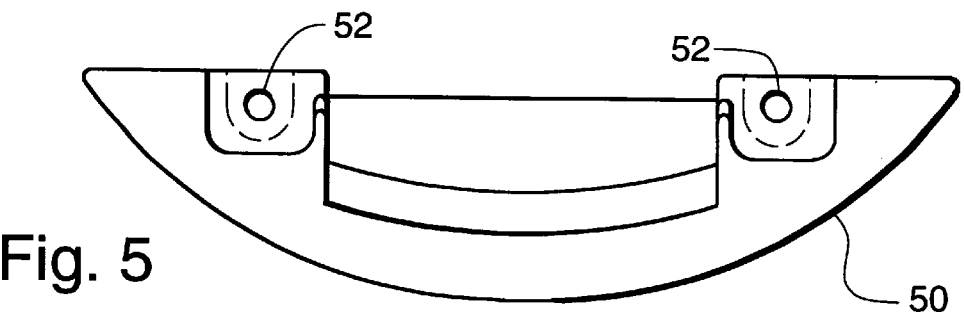
FIG. 5 is a top plan detail view of the rock guard used on the modular disc cutterbar.
Figure 6:
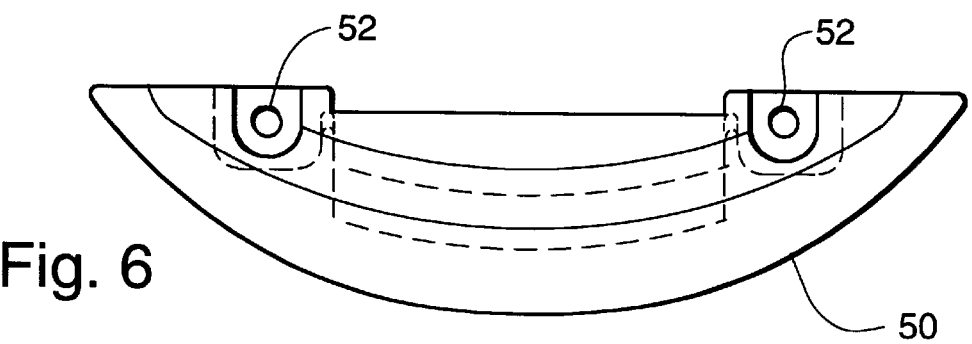
FIG. 6 is a bottom plan detail view of the rock guard shown in FIG. 5.
Figure 7:
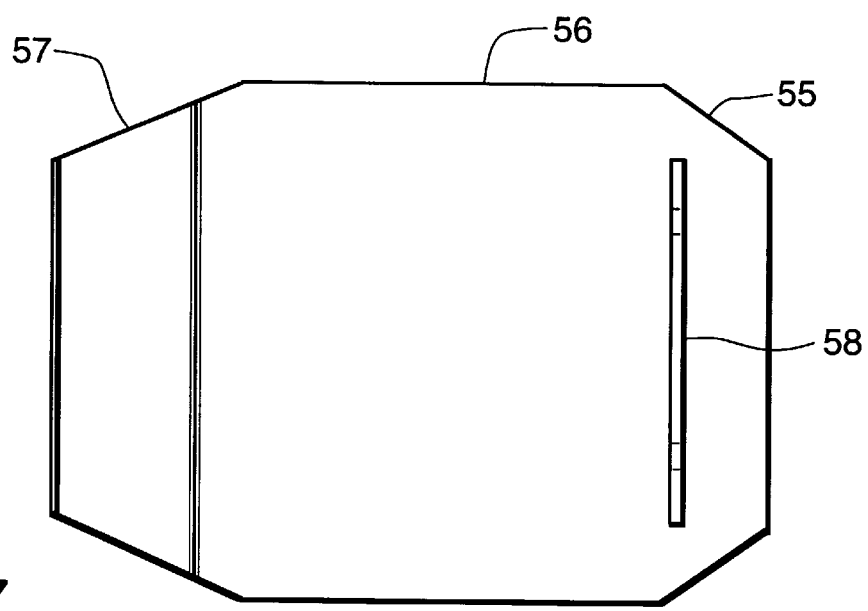
FIG. 7 is a top plan detail view of the skid shoe used on the modular disc cutterbar.
Figure 8:
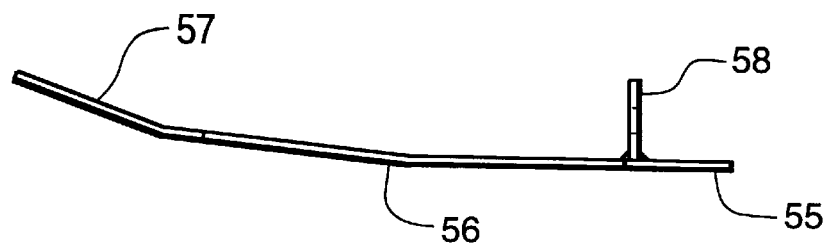
FIG. 8 is a side elevational detail view of the skid shoe shown in FIG. 7.

Referring now to the drawings and, particularly, to FIGS. 1 and 2, the modular disc cutterbar incorporating the principles of the instant invention can best be seen in the configurations in which the disc cutterbar is conventionally utilized. Left and right references are used as a matter of convenience and are determined by standing at the rear of the machine facing forwardly into the normal direction of travel.

In FIG. 1, the cutterbar 30 is mounted in a disc mower 10 having a support frame 11 connected to the three-point hitch mechanism 3 of the tractor T on which the mower 10 is carried in a conventional manner. The disc mower 10 receives operative power from the conventional tractor power take-off shaft (PTO) 5. The mower drive mechanism 15 receives the rotational power from the PTO 5 and transfers the rotational power to a gearbox 17, which in turn transfers the rotational power to the cutterbar drive mechanism 60. The disc mower 10 is customarily provided with a protective cover (not shown) supported from the framework 19 so as to encapsulate the cutterbar 30 to control the flow of material from the operating cutterbar 30.

An alternative configuration for the modular disc cutterbar 30 is depicted in FIG. 2 in the form of a disc mower-conditioner 20. The disc mower-conditioner 20 is typically connected to the tractor by the draft tongue 22 in a manner to be towed behind the tractor between a transport position directly behind the tractor and an operating position which is offset outboard of the tractor. To accomplish this movement of the mower-conditioner 20, the tongue 22 is pivotally connected to the wheeled frame 21 and is pivotally controlled by a hydraulic shift cylinder 23 in a conventional manner. As with the disc mower 10, the disc mower-conditioner 20 can receive operative power from a PTO shaft 5.

As is known in the agricultural arts, the mower-conditioner 20 is operative to sever standing crops from the field by the operation of the cutterbar 30 and convey the severed crops rearwardly into a conditioning mechanism 25, which can be formed in several different configurations, but is preferably in the form of a pair of counter-rotating intermeshing rubberized rolls 26 that receive the severed crop between the rolls 26 in a known manner and crush the severed crop therebetween before discharging the crushed crop rearwardly into a pair of laterally opposed windrow shields 28 that form the conditioned crop into a windrow deposited on the ground for drying.

The modular cutterbar 30 in the mower-conditioner 20 is supported by the frame 21 at both the left and right remote ends of the cutterbar 30, as opposed to the mower 10 only supporting the cutterbar 30 at the left end. As a result, bending forces are incurred in the cutterbar 30 at different places. As will be described in greater detail below, the modular cutterbar 30 is designed to provide optional long fasteners 31c to be positioned at the locations of greatest bending forces to stiffen the structure of the cutterbar 30 to withstand the bending forces. As one of ordinary skill in the art will readily recognize, the greatest bending forces in the disc mower 10 will be encountered at the left front part of the cutterbar 30 due to the lack of support for the outboard end of the cutterbar 30. Conversely, the disc mower-conditioner will encounter the greatest bending forces at the rear, center portion of the cutterbar 30, since both the left and right ends of the cutterbar 30 are supported by the frame 21.

Figure 10:
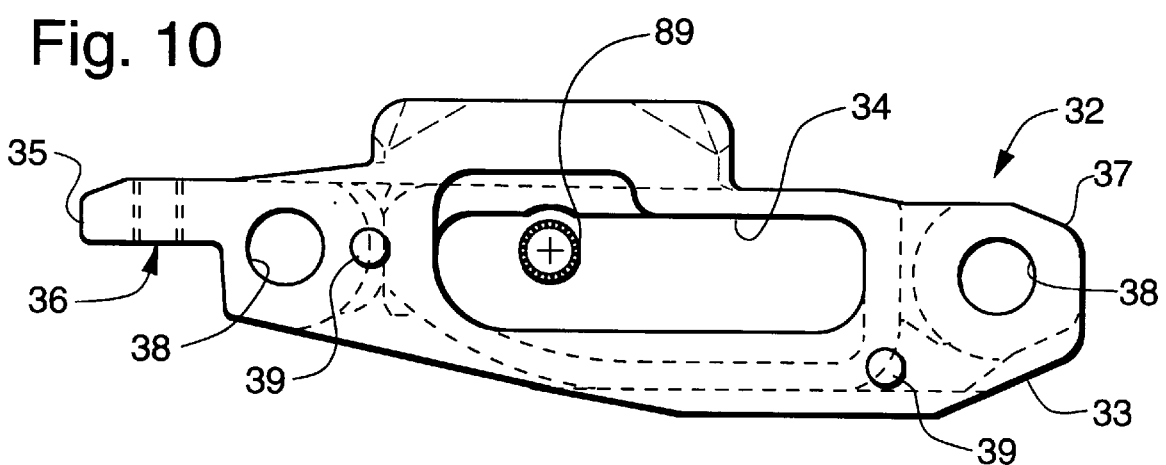
FIG. 10 is side elevational view of the spacer module shown in FIG. 9.
Figure 11:
FIG. 11 is a detail view of the splined transfer shaft passing through the spacer module to interconnect adjacent cutter module drive mechanisms.
Figure 12:
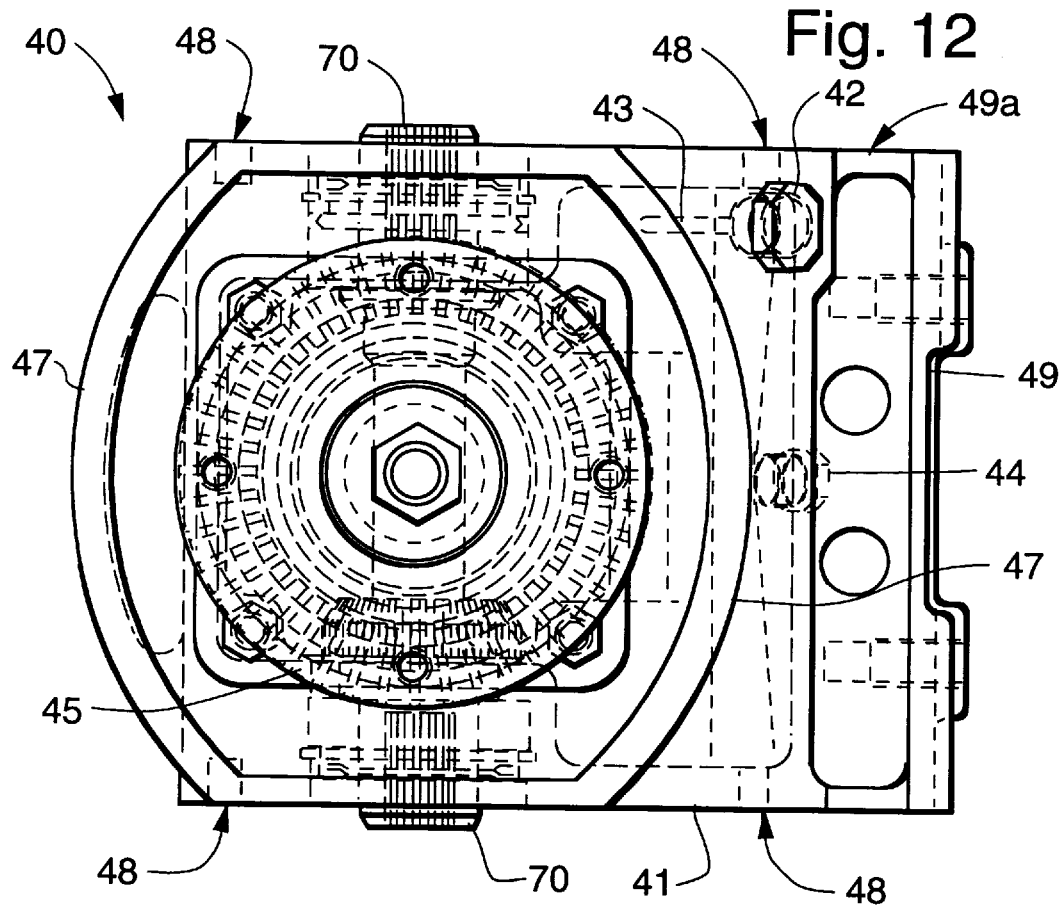
FIG. 12 is a top plan view of a cutter module forming a part of the modular disc cutterbar shown in FIGS. 3 and 4.
Figure 13:
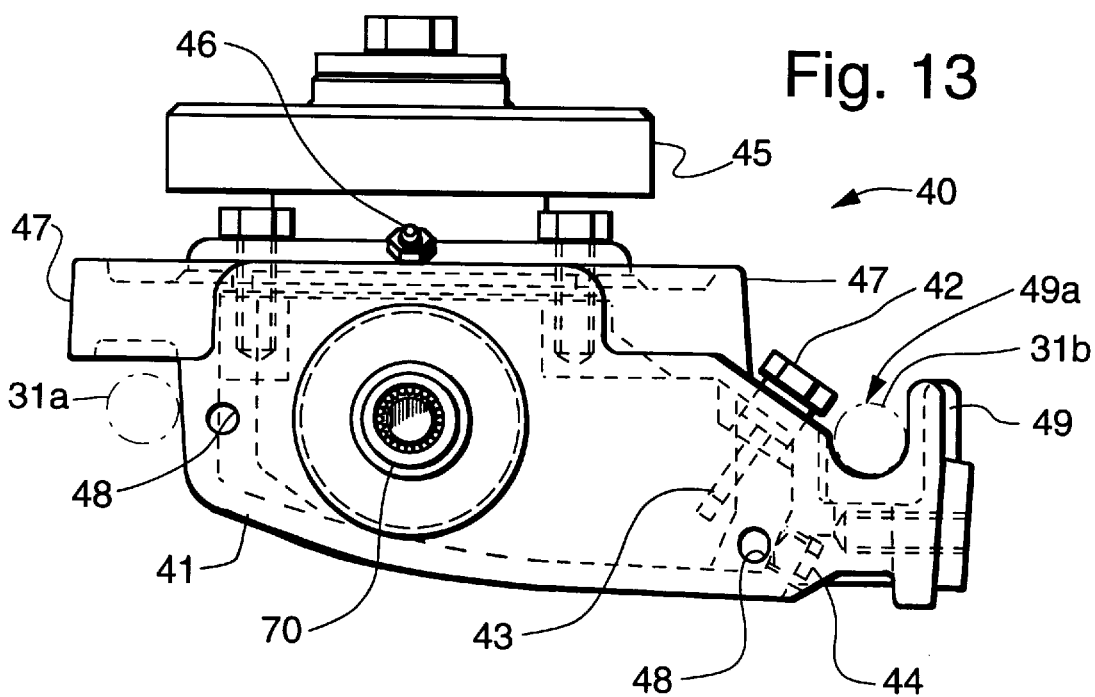
FIG. 13 is side elevational view of the cutter module shown in FIG. 12, the positions of the clamping fasteners being shown in phantom.

Referring now to FIGS. 3–14, it can be seen that the modular cutterbar 30 is formed from alternating cutter modules 40 and spacer modules 32. Each cutter module 40, as best seen in FIGS. 12 and 13, includes a hollow cast housing 41 having a specific shape to retain a low profile and to establish an oil reservoir 69 therewithin. The housing 41 supports a drive mechanism 60, described in greater detail below, to rotate a disc hub 45 positioned for rotational movement above the housing 41. As will also be described in greater detail below, the cutter modules 40 are arranged in a conventional orientation with consecutive cutter modules 40 being driven in opposite directions, such that one disc hub 45 is rotated clockwise while the next disc hub 45 is rotated counterclockwise.

Each cutter module 40 is provided with an oil plug 42 that seals off an opening into the oil reservoir 69 through which lubricating oil can be introduced into the reservoir 69. The oil plug 42 is provided with an integral dip stick 43 that extends into the oil reservoir 69 so that the oil level within the reservoir 69 can be measured. Each cutter module 40 is also provided with a drain plug 44 sealing off a corresponding opening at the bottom of the oil reservoir through which the lubricating oil within the reservoir 69 can be selectively drained by gravity. A pressure relief valve 46 is also provided in the housing 41 to allow for any release of pressure within the reservoir 69 above a pre-determined operating level.

The cutter module housing 41 is also formed with a generally circular collar 47 positioned immediately below the rotating disc hub 45. The collar 47 serves as a knife stop as will be described in greater detail below. The generally vertical sides of the housing 41 are formed with dowel recessions 48 to engage with dowel pins 39 formed on the spacer module to secure the proper spacial relationship between the spacer module 32 and the cutter module 40 during assembly into the cutterbar 30. The housing 41 is further formed with a rearward mounting wing 49 that provides structure rearward of the oil reservoir 69 for the mounting of the skid shoes 55 as will also be described in greater detail below.

Figure 9:
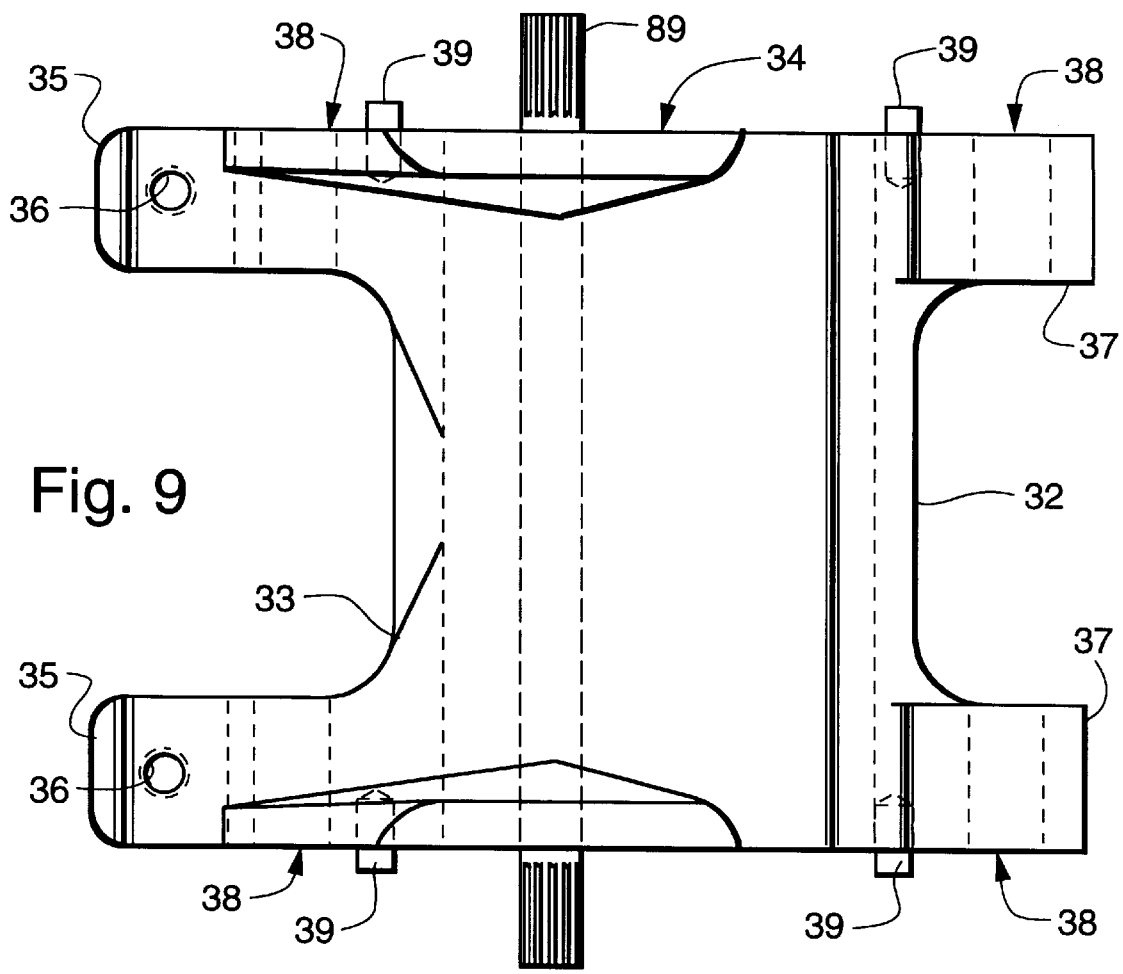
FIG. 9 is a top plan view of a spacer module forming a part of the modular disc cutterbar shown in FIGS. 3 and 4, the transfer shaft is shown in its proper location.

The spacer module 32 can best be seen in FIGS. 9 and 10. The spacer module 32 is formed as a cast housing 33 having a transverse passageway 34 extending therethrough to allow for the passage of the transfer shaft 89 and to keep the weight of the spacer module 32 to a minimum. The housing 33 is formed with a pair of forwardly extending mounting arms 35 and a corresponding pair of rearwardly extending mounting arms 37, each arm 35, 37 being formed with a transverse opening 38 extending therethrough. Each of the forward mounting arms 35 is also formed with a vertical hole 36 near the tip of the corresponding mounting arm 35 to permit the mounting of rock guards 50 for the cutter modules 40, as will be described in greater detail below. Each of the opposing, generally vertical sides of the spacer modules 32 are provided with a pair of dowel pins 39 positioned for a corresponding engagement with the dowel recessions 48 in the cutter modules 40.

Figure 14:
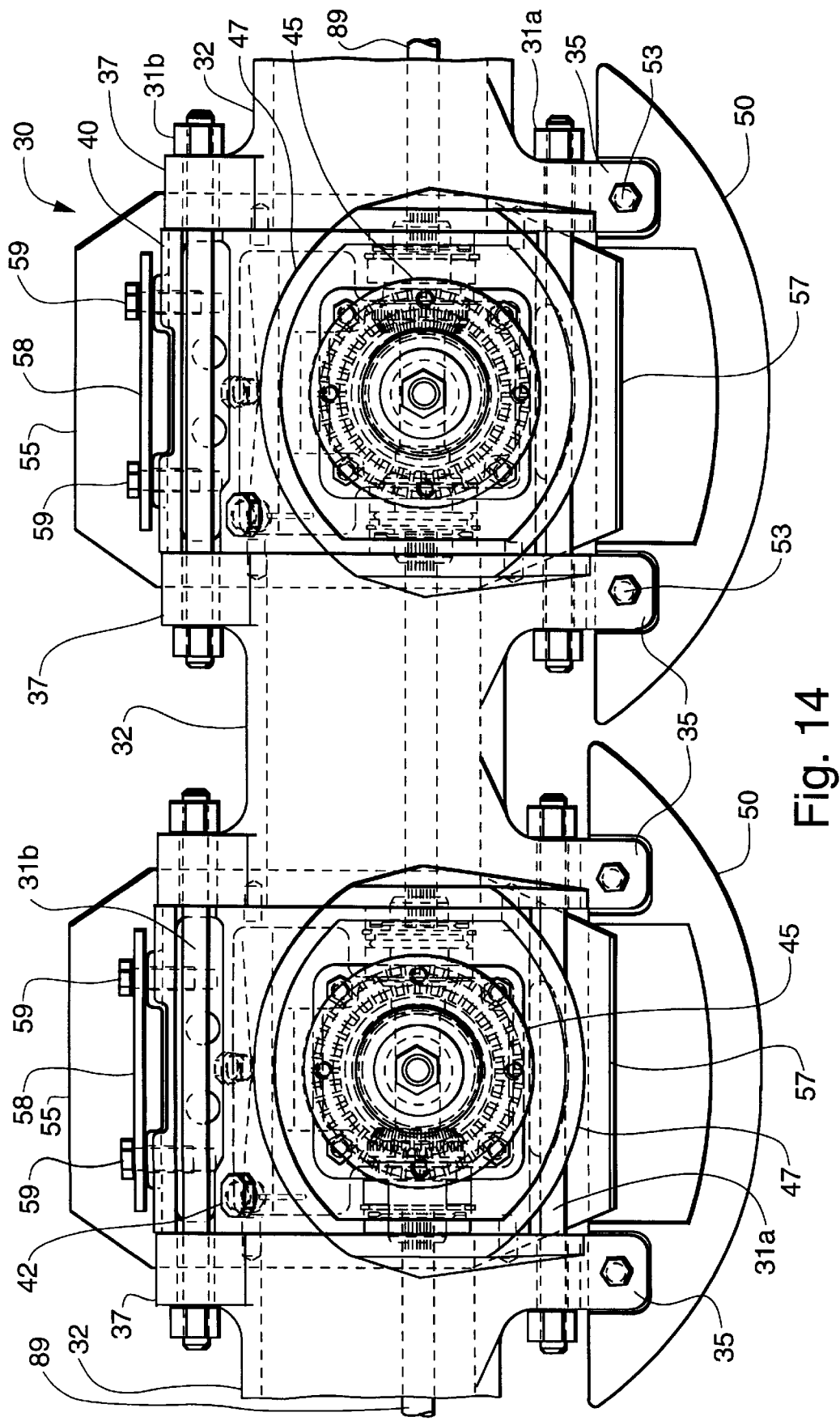
FIG. 14 is an enlarged top plan view of a central portion of the assembled modular disc cutterbar depicting two cutter modules and an interstitial spacer module, portions of the spacer modules on the opposite sides of the cutter modules being broken away, the disc members being removed for purposes of clarity.

As best seen in FIGS. 3, 4 and 14, the cutterbar 30 is constructed by connecting in alternating fashion cutter modules 40 and spacer modules 32. Each of the cutter modules 40 is clamped between the adjacent spacer modules 32 by a pair of fasteners 31 extending through the openings 38 in the mounting arms 35, 37 immediately next to the cutter module 40. Neither the forward or rearward fasteners 31a, 31b engage the cutter module 40, but pass forwardly and rearwardly, respectively, of the housing 41 The rearward fastener 31b passes through a trough 49a formed in the rearward mounting wing, while the forward fastener 31a passes beneath the collar 47. The interengagement of the dowel pins 39 and the dowel recessions 48 position each spacer module 32 properly with respect to the cutter module 40 and the clamping pressure is limited only to the tensile strength of the fasteners 31a, 31b.

To provide additional stiffness for the assembled cutterbar 30 in order to withstand the maximum bending forces exerted on the cutterbar 30 during operation thereof over the field, the normal fasteners 31a, 31b, which have a length that extends only between the opposing mounting arms 35, 37 on each side a cutter module 40, can be replaced with an extra long fastener 31c that has a length that corresponds to at least two cutter modules 40. The extra long fastener 31c must be appropriately threaded so that a nut can be engaged thereon to effect the proper clamping force on the intermediate mounting arm 35, 37. As depicted in FIGS. 3 and 4, the extra long fastener 31c is preferably positioned at the left, front (inboard) end of the cutterbar 30 when the cutterbar 30 is used in a cantilevered disc mower 10 configuration and at the rear, central part of the cutterbar 30 when the cutterbar 30 is used in a disc mower-conditioner 20 configuration that supports the cutterbar 30 at the opposing ends thereof, as described above.

Referring now to FIGS. 5–8 and 14–16, it can be seen that each of the cutter modules 40 is provided with a forwardly positioned rock guard 50 and a skid shoe 55 that passes beneath the cutter module 40 for engagement with the surface of the ground. The rock guard 50 has a conventional semi-circular configuration, but is mounted to the opposing forward mounting arms 35 of the spacer modules 32 adjacent to the corresponding cutter module 40. The rock guard 50 is formed to correspond to the specific shape of the forward mounting arms 35 so that when mounted thereon the rock guard 50 fits snugly against the forward mounting arms 35.

A fastener 53 passes through appropriately positioned holes 52 within the rock guard 50 to engage the vertical holes 36 in the opposing mounting arms 35. Either the vertical holes 36 are preferably threaded for engagement of the fasteners 53 or a nut secures the fastener 53. The specific shape of the rock guard 50 and the mounting arm 35 will allow the fastener 53 to be countersunk so as to protect the fastener 53 from wear. Since the rock guard 50 is not mounted on the cutter module 40, any damage related to the apparatus for mounting the rock guard 40 will affect the spacer modules 32 and not necessarily the cutter module 40. One skilled in the art will recognize that damaged spacer modules 32 would be less expensive to replace than the much more complex cutter modules 40.

One skid shoe 55 is mounted beneath each cutter module 40 to protect the cutter module 40 from wear due to engagement with the surface of the ground. Each skid shoe 55 is formed as a generally planar body portion 56 with a mounting tab 58 welded thereto and projecting upwardly, generally perpendicularly to the body portion 56. The body portion 56 is also formed with a forward end 57 that is bent upwardly to engage with the corresponding rock guard 50. The skid shoes 55 are easy and convenient to mount to and remove from the cutterbar 30. The forward end 57 is simply tucked up into the gap between the cutter module 40 and the rock guard 50 to rest against the rock guard 50. The mounting tab 58 is then secured to the rearward mounting wing 49 of the cutter module 40 by fasteners 59 that thread into the corresponding threaded holes formed in the mounting wing 49.

The body portion 56 of the skid shoe 55 extends rearwardly of mounting tab and, therefore, the cutter module 40 to provide optimum flotation and extended wear life of the skid shoe. The utilization of the long skid shoe requires a rigid support behind the cutter module so that the skid shoe does not bend upward at the rear due to ground forces. With this cutterbar design, the extended module support is integral with the module housing and an additional bolt-on part is not required to support the skid shoe. The mid-section of the skid shoe is also supported from the cutter module. The lower surface of the cutter module housing 41 is sloped downward to be generally parallel with the skid shoe 55 and in contact therewith. This support will prevent the skid shoe from deforming when it makes hard contact with an obstacle. As a result, the thickness of the skid shoe material can be made thinner than if no support were provided in the mid-section. This structure also allows for a lighter, yet efficient cutterbar structure.

Referring now to FIGS. 15–20A, the modular drive mechanism 60 can best be seen. The disc hub 45 is detachably splined onto a driven shaft 61 having an integral driven gear 62 positioned within the oil reservoir 69. A disc member 65 is detachably connected to the disc hub 45 by fasteners 66 so as to be rotatable therewith. The driven shaft 61 is rotatably supported by a bearing block 63 detachably mounted to the cutter module housing 41 by fasteners 64. The bearing block 63 seals an opening in the top of the housing 41 through which the driven gear can be extracted from the oil reservoir 69.

Figure 20:
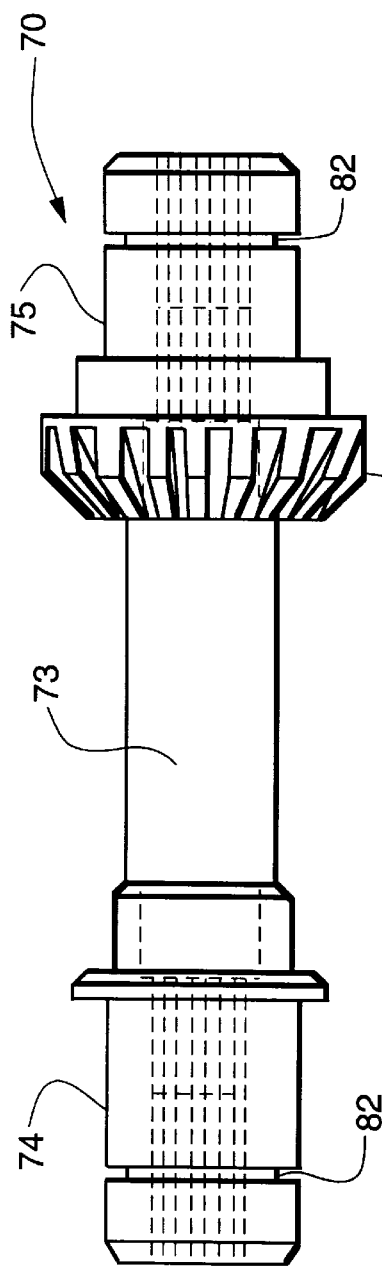
FIG. 20 is an enlarged elevational view of the modular drive shaft forming a part of the drive mechanism of the cutter module shown in FIG. 17.
Figure 20A:
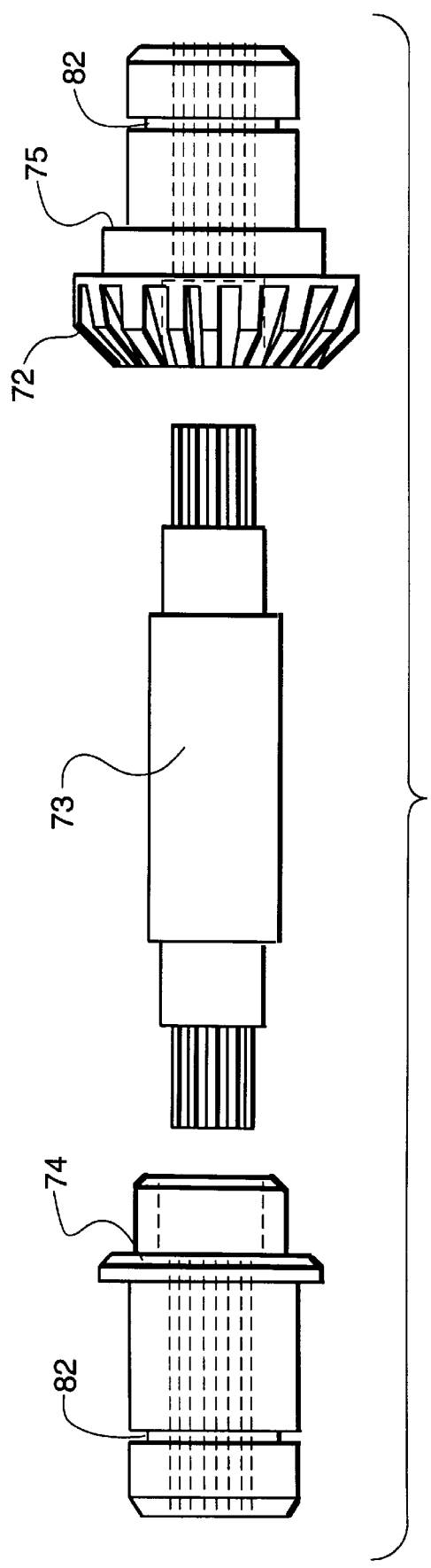
FIG. 20A is an exploded view of the modular drive shaft shown in FIG. 20.

The driven gear 62 is drivingly engaged with a drive gear 72 forming part of a drive shaft assembly 70 extending transversely through the cutter module 40 beneath the driven gear 62. As best seen in FIGS. 17, 20 and 20A, the drive shaft assembly 70 has a modular construction and is formed from a central shaft member 73 that is splined at each opposing end thereof, a drive transfer hub 74 that is engaged with one splined end of the shaft member 73 and a gear hub 75 which is splined on the opposing splined end of the shaft member 73. The gear hub 75 is formed with the drive gear 72 being an integral part thereof.

As seen in FIG. 17, the direction of rotation of the disc member 65 is controlled by the orientation of the drive shaft assembly 70 when placed within the assembled cutter module 40, as the placement of the drive gear 72 on opposing sides of the driven gear 62 will effect opposite directions of rotation of the disc member 65. Except for the protrusion of the drive gear 72, the drive shaft assembly 70 is substantially symmetrical to enable the drive shaft assembly 70 to be reversed to switch the direction of rotation of the corresponding disc member 65 by simply rotating the drive shaft assembly 180 degrees, as depicted in FIG. 17. The opposing bearings 76 are located in the same position independently of the orientation of the drive shaft assembly 70.

As best seen in FIGS. 17–19, the drive shaft assembly 70 is rotatably supported within the oil reservoir 69 by a pair of opposing tapered roller bearings 76 positioned with the cone apex of the bearing being oriented outwardly and associated seals 77 operable to seal the opening extending transversely through the cutter module housing 41 at the opposing sides thereof. The rotating tapered bearing rollers pump oil away from the cone apex side of the bearing which causes all of the lubricating oil outside of the bearing to be pumped toward the inner portion of the cutter module reservoir 69. As a result of the high speed operation, i.e. 5400 rpm, of the drive shaft component, the area outside of the bearings, including the radial lip seal area, is without lubricating oil. Without an adequate supply of lubricating fluid, the heat generated from the frictional drag of the shaft surface against the lip of the seal 77 can raise the temperature in this portion of the cutter module 40 above 350 degrees which is damaging to the seal material.

In order to move lubricating oil into the seal area, a groove 79 is cast into the housing 41 within the cutter module 40 beneath the respective bearings 76. The grooves 79 permit lubricating oil to flow from the oil reservoir 69, past the bearings 76 and into the area near the seals 77. The action of the rollers in the tapered bearing 76 pumps the oil back into the oil reservoir 69 almost immediately. To assure an adequate dispersion of the oil to the seals 77, each end of the drive shaft assembly 70 is provided with an oil slinger 80.

The oil slinger 80 is positioned on the respective hub 74, 75 of the drive shaft assembly 70 in close proximity to the corresponding seal 77. The oil slinger 80 is split and clamps into a groove 82, best seen in FIGS. 20 and 20A, machined into both the drive transfer hub 74 and the gear hub 75 in the same manner as a conventional external bearing retaining ring. The oil slinger 80 has a plurality of alternating angled blades 85 which pass through the oil as it flows from the groove 79. The blades 85 pick up the oil and disperse the oil axially in the area adjacent the seal lip so that the seal 77 does not operate without an adequate supply of lubricating oil.

The rotation of the oil slinger 80 also acts as a heat conductor by transferring heat from the shaft assembly 70 to the lubricating oil. The utilization of alternating angled blades 85 allows the oil slinger 80 to be mounted on the drive shaft assembly 70 in either direction. The machined groove 82 in the hubs 74, 75 in which the oil slinger 80 is positioned, correctly locates the oil slinger 80 along the axis of the drive shaft assembly 70 so that the assembly of the oil slinger 80 onto the drive shaft assembly 70 does not require a gage.

The drive mechanism 60 in each cutter module 40 is coupled to the other cutter module drive assemblies 70 by a transfer shaft 89 that passes through the spacer module 32, as best depicted in FIGS. 9–11. The transfer shaft 89 is splined at each opposing end thereof to be drivingly received within either of the hubs 74, 75 to transfer rotational power thereto. In assembling a disc cutterbar 30, not only does the cutter modules 40 need to be clamped between adjacent spacer modules 32 by the clamping fasteners 31, but the drive line must also be connected by coupling the transfer shafts 89 between the exposed hubs 74, 75 in the adjacent cutter modules 40. One skilled in the art will realize that both of the hubs 74, 75 are splined through an interior passageway so as to be able to receive both the shaft member 73 in one side thereof and the transfer shaft 89 in the other side thereof.

Referring now to the configurations of utilization of the cutterbar 30 as depicted in FIGS. 3 and 4, it can be seen that the drive mechanism 60 in a disc mower 10 receives rotational power from a gearbox 17 that is supported adjacent the inboardmost cutter module 40. Accordingly, the drive assembly 70 is connected directly to the output shaft (not shown) of the gearbox 17. The transfer of rotational power to the remaining cutter modules 40 proceeds as described above.

In the disc mower-conditioner 20 configuration, the rotational power is delivered to the first cutter module 40a by a power input shaft 29 that directly drives the first disc member 65 from above. Rotational power is then transferred to the drive assembly 70 from the driven gear 62 to the drive gear 72 and then transferred to the remainder of the cutter modules 40 as described above. If the cutterbar 30 is large, i.e. has eight or more cutter modules, it is preferable to duplicate the driving of the last cutter module 40b as with the first cutter module 40a with a power input shaft 29 vertically descending into the disc member 65 for direct driving thereof. In this instance, the transfer shaft 89 between the two central cutter modules 40 is removed so that the respective power input shafts 29 are each operable to power half of the cutter modules 40. Because of the necessity of maintaining proper timing between the two central cutter modules 40 for proper operation thereof, the timing of the two power input shafts 29 must be properly maintained.

Figure 15:
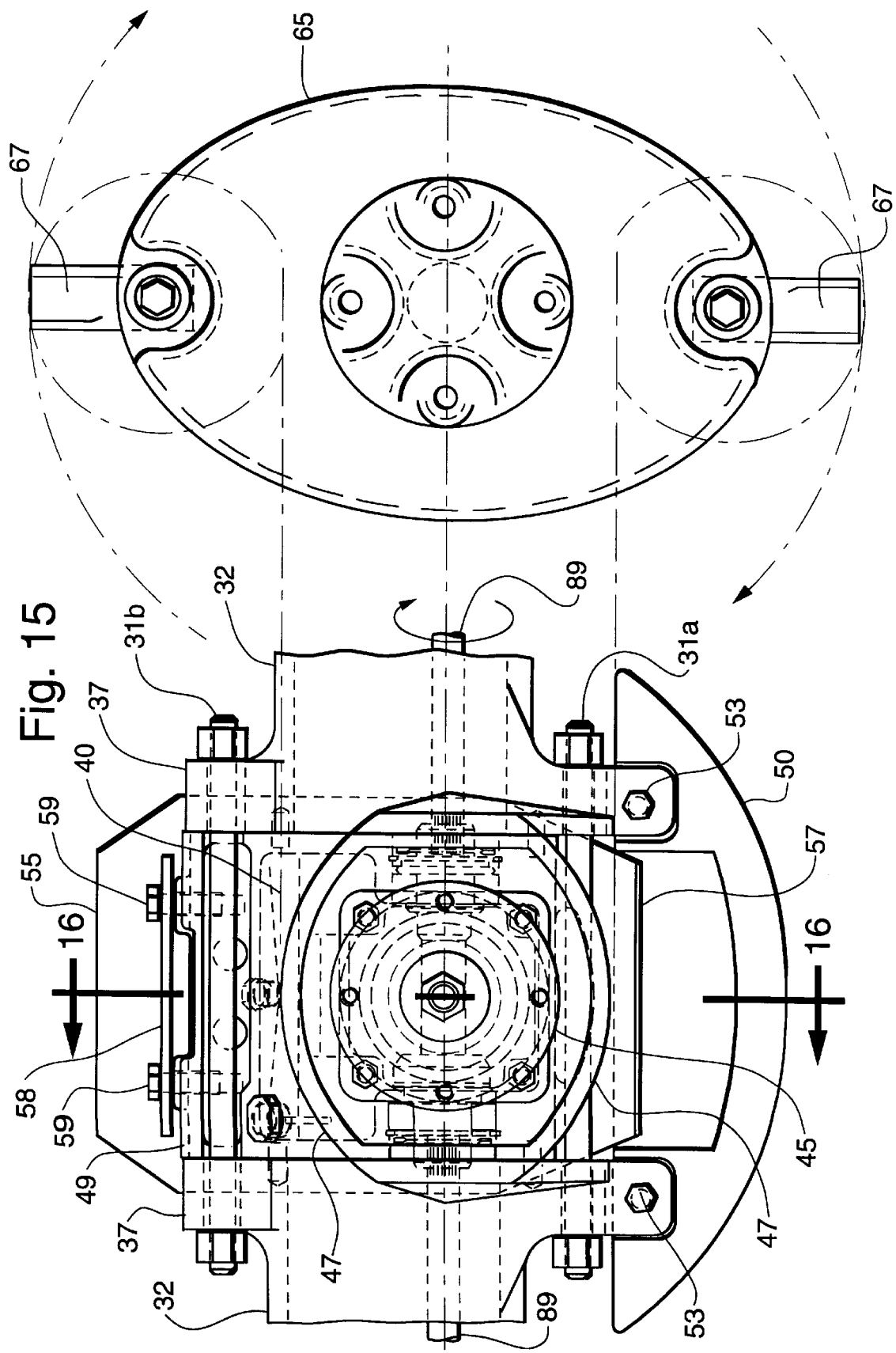
FIG. 15 is a top plan view of a single cutter module and portions of the attached spacer modules with the disc member thereof being displaced to the right of the cutter module for purposes of clarity, the rotational path of the disc member being shown in phantom, as is the pivotal movement of the knives mounted on the disc member with the interference with the cutter module housing casting to serve as a stop member also being demonstrated in phantom.
Figure 16:
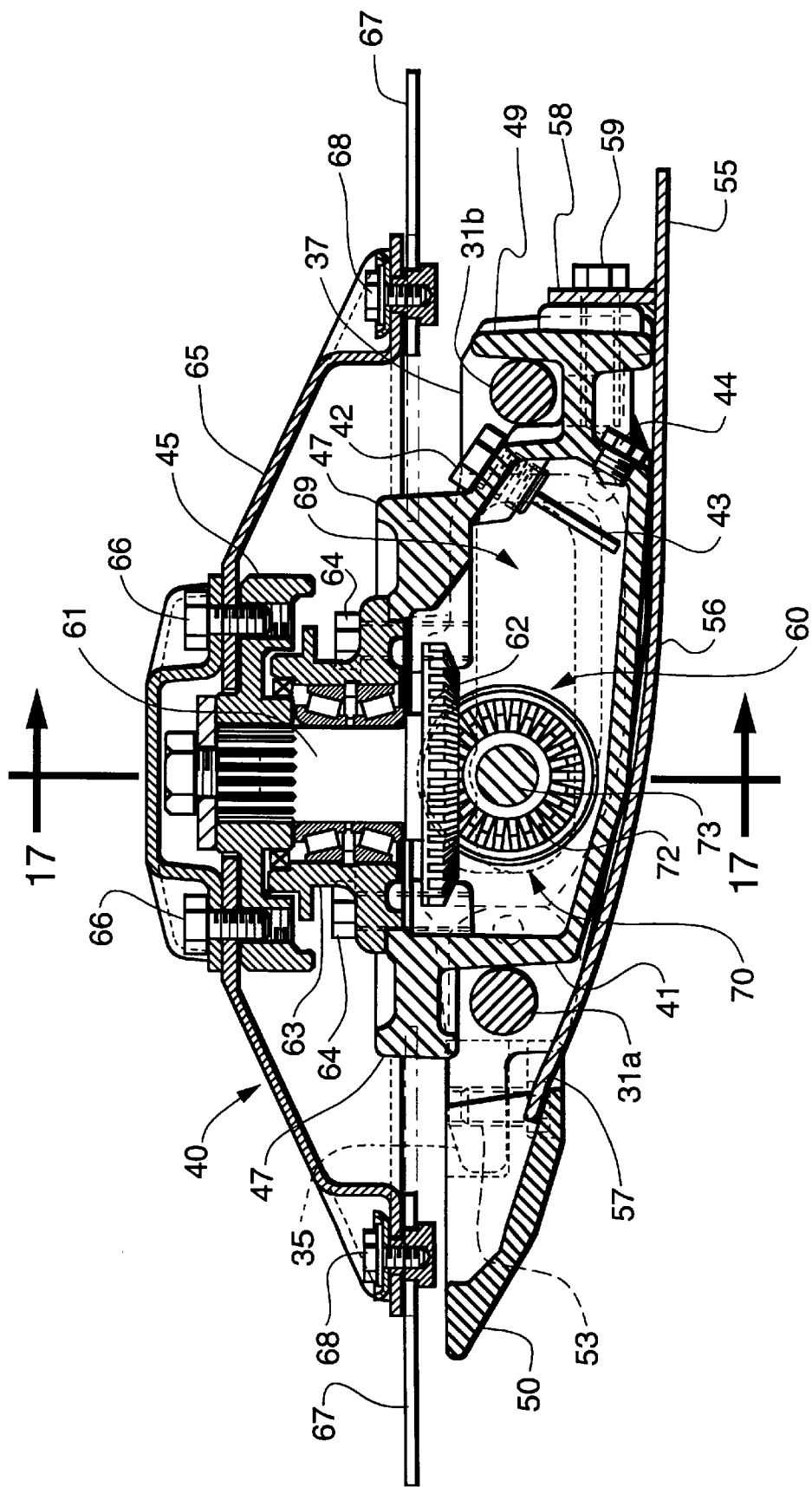
FIG. 16 is a cross-sectional view of the cutter module taken along lines 16—16 of FIG. 15, the disc member being shown in its mounted position on the cutter module, the use of the cutter module housing casting as a stop member for the knives being shown in phantom.

As best seen in FIG. 15, each disc member 65 is somewhat oval in shape and is provided with a cutting knife 67 pivotally mounted at the opposing ends of the major axis of the disc member by a bolt 68. Once operating at normal rotational speed of about 5400 revolutions per minute, the knives 67 are extended radially by centrifugal force. Occasionally, however, the knife 67 will strike a hard object, such as a rock or tree stump, that will deflect the knife 67 rearwardly. It is desirable that the knife 67 strike a stop member to prevent the knife 67 from making a complete revolution about its mounting bolt 68 or to prevent the knife 67 from becoming jammed.

Rather than provide a knife stop on the disc member 65, which would increase the mass of the disc member 65 being rotatably driven and potentially cause the disc member 65 to be rotationally unbalanced, particularly if the stop is constructed such that cut crop can build up on the stop, the collar 47 serves as a knife stop. As demonstrated in FIG. 15, the knives 67 cannot make a complete revolution about its mounting bolt 68 without impacting the collar 47.

Figure 21:
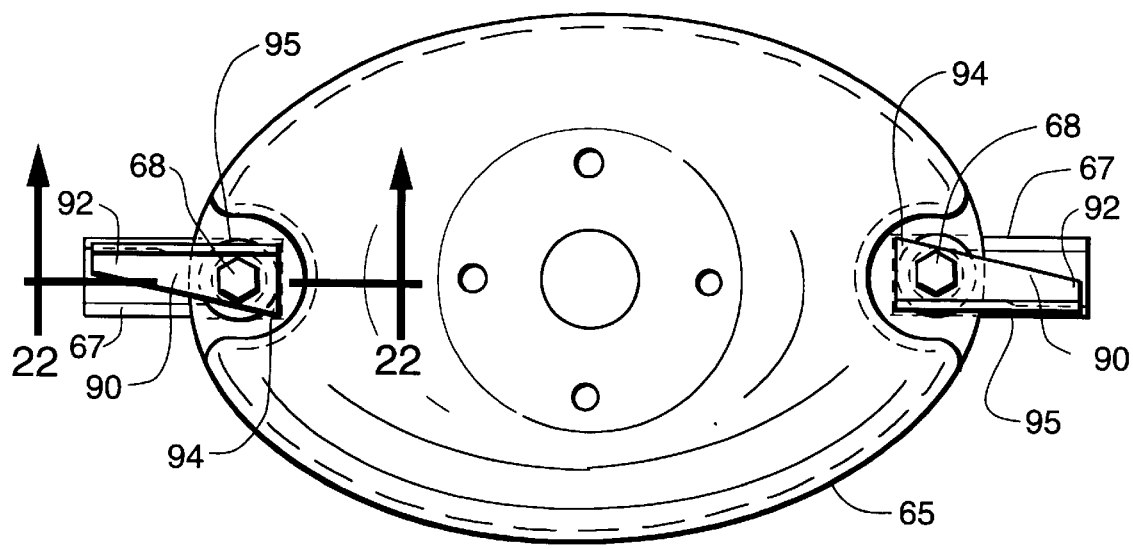
FIG. 21 is a top plan view of a disc member equipped with a crop mover mounted above the cutting knife.
Figure 22:
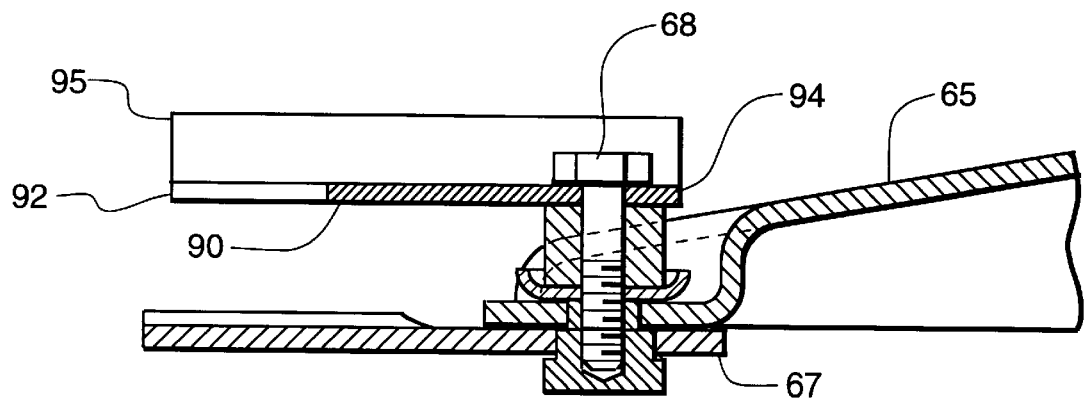
FIG. 22 is an enlarged cross-sectional view of the crop mover and associated cutting knife taken along lines 22—22 of FIG. 21.

An optional configuration of the disc member 65 is shown in FIGS. 21 and 22. Pivotally supported on the disc members 65 immediately above the cutting knife 67 is a angled crop mover 90, mounted on the bolt 68 to rotate with the knife 67 and being operable to transfer crop material just severed by the action of the cutting knife 67 away from the knife 67. Specifically, the angled crop mover 90 prevents the severed crop from falling forwardly into the standing crop material and, thereby, restrict the ability of the knife 67 to sever the crop on the next pass.

The shape of the crop mover 90 is angled outwardly such that the radially outward tip 92 of the crop mover 90 has less horizontal circumferential width than the radially inward portion 94. With this particular configuration, the crop mover will not interfere with the cutting action at the outward tip of the cutting knife 67. The crop mover 90 is also angled to have a vertically oriented portion 95 to act aggressively in the moving of severed crop away from the cutting knife 67. The crop mover 90 must be mounted to swing freely about its pivotal mounting on the bolt 68 to prevent damage thereto upon impact with an obstacle, and, optionally have a protective surface (not shown) for the mounting bolt 68. The crop mover 90 is specifically configured as to not interfere with the action of the cutting edge of the knife 67.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a disc cutterbar having a plurality of transversely spaced cutter modules, each said cutter module having a disc member rotatably supported thereon and carrying a cutting knife to sever standing crop material by impact action upon rotation of said disc member; and a spacer module separating adjacent cutter modules, the improvement comprising:

each said spacer module having a pair of transversely spaced, forwardly extending forward mounting arms, a pair of transversely spaced, rearwardly extending rearward mounting arms and a transverse passageway extending therethrough;

a front fastener corresponding to each said cutter module and being engaged with a one of said forward mounting arms adjacent the corresponding said cutter module on one transverse side thereof and with a one of said forward mounting arms adjacent said corresponding cutter module on the opposing transverse side thereof; and a rear fastener corresponding to each said cutter module and being engaged with each said rear fastener being engaged with the adjacent rearward mounting arms of the spacer modules on the opposing transverse sides of said cutter module, at least one of said front and rear fasteners having a length sufficient to overlap more than one cutter module and being located at a preselected position to resist bending moments induced into said disc cutterbar during the operation thereof.

2. The disc cutterbar of claim 1 wherein said disc cutterbar further includes dowel pins carried between each said cutter module and the adjacent said spacer module to orient each said spacer module relative to the adjacent said cutter module.

3. The disc cutterbar of claim 2 wherein said disc cutterbar is supported from a frame at one end thereof, said at least one fastener having a length sufficient to overlap more than one cutter module being positioned at said one end supported by said frame.

4. The disc cutterbar of claim 3 wherein said at least one fastener having a length sufficient to overlap more than one cutter module is a front fastener.

5. The disc cutterbar of claim 2 wherein said disc cutterbar is supported from a frame at each opposing end thereof, said at least one fastener having a length sufficient to overlap more than one cutter module being positioned at a central part of disc cutterbar.

6. The disc cutterbar of claim 5 wherein said at least one fastener having a length sufficient to overlap more than one cutter module is a rear fastener.

* * * * *